US012664705B1

(12) United States Patent
Lal et al.

(10) Patent No.: US 12,664,705 B1
(45) Date of Patent: Jun. 23, 2026

(54) IMAGE EDITING FOR SMALL MASKS

(71) Applicant: Amazon Technologies, Inc., Seattle, WA (US)

(72) Inventors: Shamit Lal, Seattle, WA (US); Ying Wang, Bothell, WA (US); Yusheng Xie, Redwood City, CA (US); Ashwin Swaminathan, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 108 days.

(21) Appl. No.: 18/741,075

(22) Filed: Jun. 12, 2024

(51) Int. Cl.
*G06T 11/60* (2026.01)
*G06T 3/4046* (2024.01)

(52) U.S. Cl.
CPC ............ *G06T 11/60* (2013.01); *G06T 3/4046* (2013.01); *G06T 2210/22* (2013.01)

(58) Field of Classification Search
None
See application file for complete search history.

(56) References Cited

U.S. PATENT DOCUMENTS

| | | | | |
|---|---|---|---|---|
| 2023/0368341 | A1* | 11/2023 | Xu | G06T 5/77 |
| 2024/0331247 | A1* | 10/2024 | Smith | G06T 13/80 |
| 2025/0054115 | A1* | 2/2025 | Lin | G06T 7/11 |
| 2025/0285243 | A1* | 9/2025 | Wen | G06T 5/77 |
| 2025/0322570 | A1* | 10/2025 | Chen | G06F 40/35 |
| 2025/0336130 | A1* | 10/2025 | Joshi | G06T 11/60 |

* cited by examiner

*Primary Examiner* — James A Thompson
(74) *Attorney, Agent, or Firm* — K&L Gates LLP

(57) ABSTRACT

Techniques are generally described for improved image editing for small masks. A first source image may be received. First mask data identifying first pixels of the first source image may be received. A ratio between a size of the first mask data and the first source image may be below a threshold. A second source image that includes the first pixels of the first source image and second pixels of the first source image that at least partially surround the first pixels may be generated. Upsampled image data may be generated by upsampling the second source image. Upsampled mask data may be generated by upsampling the first mask data. A diffusion-based inpainting model may generate a first inpainted image that includes the upsampled image data inpainted in a region corresponding to the upsampled mask data.

20 Claims, 12 Drawing Sheets

700

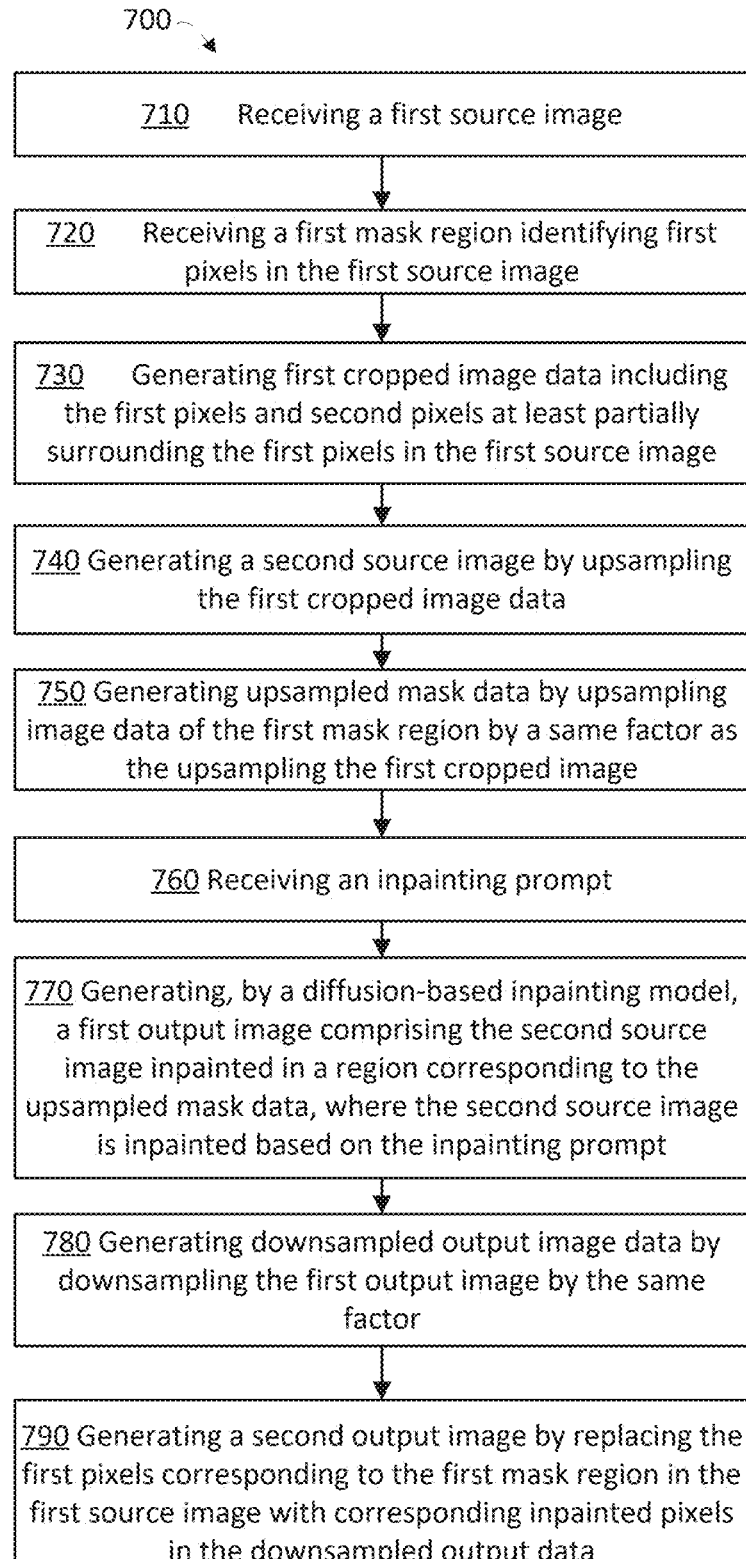

710    Receiving a first source image

720    Receiving a first mask region identifying first pixels in the first source image 730    Generating first cropped image data including the first pixels and second pixels at least partially surrounding the first pixels in the first source image 740 Generating a second source image by upsampling the first cropped image data 750 Generating upsampled mask data by upsampling image data of the first mask region by a same factor as the upsampling the first cropped image 760 Receiving an inpainting prompt 770 Generating, by a diffusion-based inpainting model, a first output image comprising the second source image inpainted in a region corresponding to the upsampled mask data, where the second source image is inpainted based on the inpainting prompt 780 Generating downsampled output image data by downsampling the first output image by the same factor 790 Generating a second output image by replacing the first pixels corresponding to the first mask region in the first source image with corresponding inpainted pixels in the downsampled output data

FIG. 7

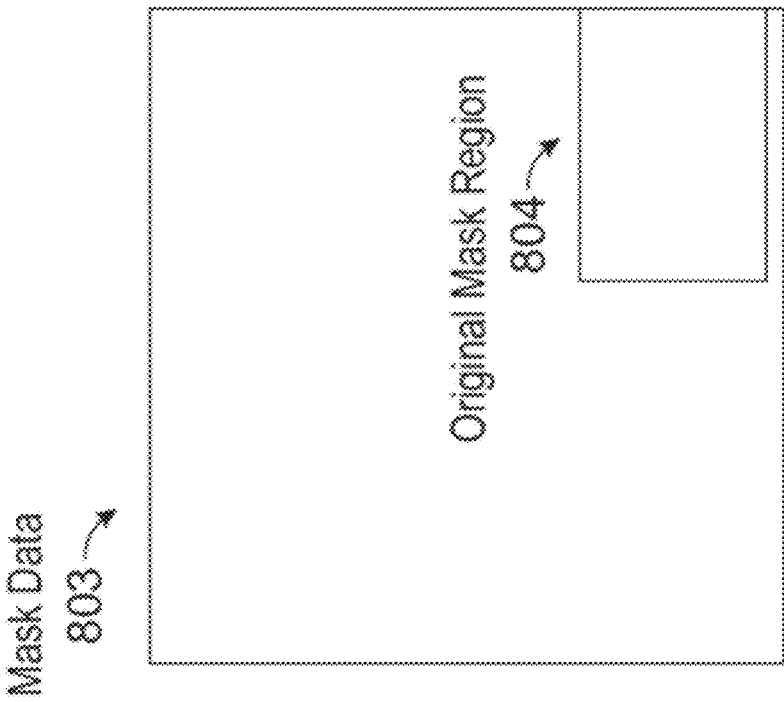
Mask Data 803
Original Mask Region 804
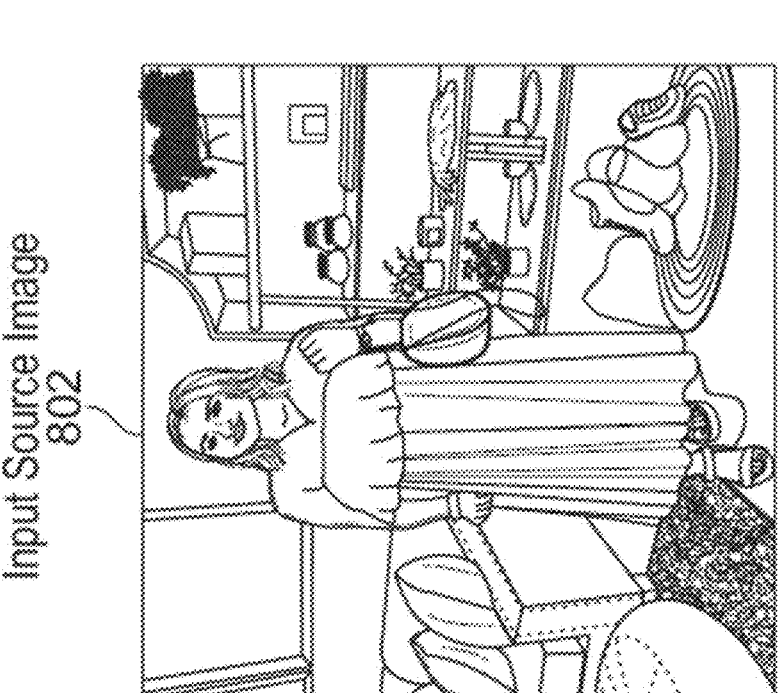
Input Source Image 802
$$\frac{\text{Mask Size}}{\text{Input Frame Size}} < \text{Thresh}$$
FIG. 8A

IMAGE EDITING FOR SMALL MASKS

BACKGROUND

Generative artificial intelligence models are able to generate high quality text, images, and/or other content based on input prompts. For example, generative transformer-based language models are able to synthesize natural-sounding text, and generative adversarial networks and other image generation models are able to create natural looking images.

BRIEF DESCRIPTION OF DRAWINGS

FIG. 7 is a block diagram illustrating an example process for inpainting using small masks, in accordance with embodiments of the present disclosure.

FIGS. 8A-8E illustrate example operations for inpainting using a small mask, in accordance with various aspects of the present disclosure.

DETAILED DESCRIPTION

Figure 1:
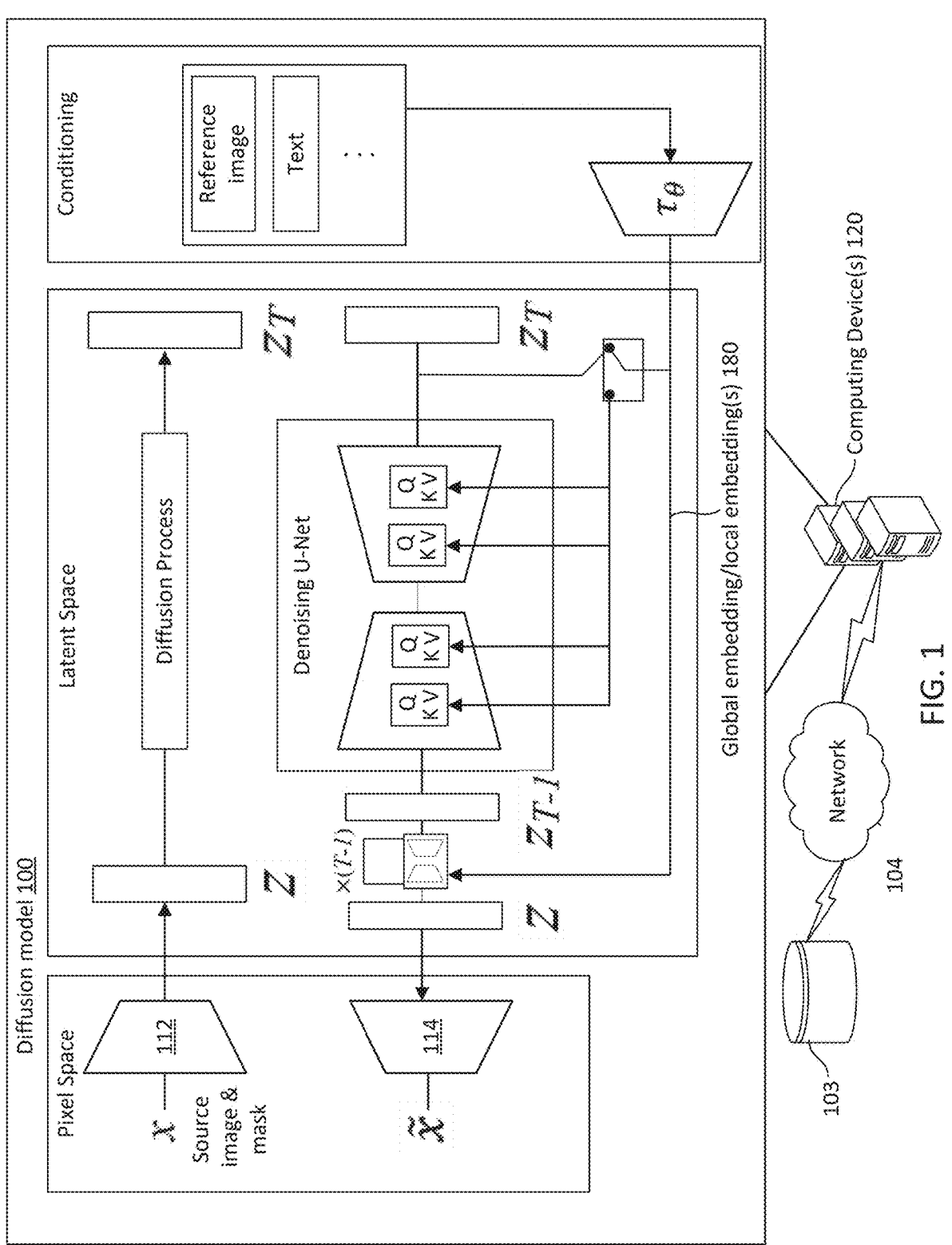
FIG. 1 depicts an example diffusion model that may use local embeddings and global embeddings for inpainting, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Inpainting is a digital image processing technique that may be used to replace one portion of a source image with other image data from a reference image. For example, inpainting may be used in image editing to restore or reconstruct missing or damaged parts of photographs. In this context, inpainting may include replacing the relevant part of the source image with new plausible image data (e.g., pixel values) from the reference image based on the surrounding pixels or other information. For example, the source image may be an image of a waterfall and the reference image may be an image of a person. A masked region may be identified in the source image (e.g., by manually drawing a box or other shape in the source image and/or using natural language to identify a particular region or object in the source image where inpainting should occur). The inpainting task may be to render image data representing the person in the reference image in the source image in the location of the mask in a natural-looking way. Ideally, inpainting is performed such that the inpainted entity from the reference image appears naturally within the source image (e.g., based on prevailing illumination conditions, pose, size, etc.). "Image-conditioned" inpainting refers to situations in which a reference image (e.g., including an entity to be inpainted) is used to condition inpainting within the masked region of a source image by a generative model (e.g., a diffusion model).

Some diffusion-based models may struggle to generate realistic-looking inpainted regions during inpainting when the masked region is small relative to the overall size of the image. For example, conventional inpainting models may fill in the background instead of following the inpainting prompt and/or may lack detail in the inpainted region when the mask size is small relative to the overall image size. Accordingly, described herein are systems and techniques that may be used to improve inpainting and image editing when the mask size is small (e.g., when the size of the mask relative to the size of the source image is less than a threshold value). The various systems and techniques may crop an area of the input image that includes at least some of the pixels that surround the original mask (as context for the background). The original mask and cropped region may be upsampled to generate an upsampled cropped region from the input image (to be used as a source image for inpainting) and an upsampled mask. Inpainting (using a diffusion model) may occur using the upsampled cropped region, the upsampled mask, and any desired prompt (e.g., a text prompt and/or image prompt) as inputs. The output may be an upsampled, inpainted version of the input cropped region. The output may be downsampled to the resolution of the original input image. Thereafter, the pixels corresponding to the original mask in the input image may be replaced by corresponding pixels (as identified using matching pixel coordinates) in the downsampled, inpainted image. These techniques result in superior inpainted output images for small masks. These techniques are described in further detail below.

Some conventional image-conditioned inpainting techniques (e.g., the "paint by example" (PBE) model) extract the global embedding from a reference image and condition the inpainting by the diffusion model on the global embedding. In this context, a global embedding refers to an embedding generated using an image encoder model that represents the entire reference image (e.g., an embedding extracted from an output layer (or other relatively deep layer) of a convolutional neural network (CNN), visual transformer-based encoder (such as the contrastive language-image pretraining (CLIP) encoder), and/or other image encoder). Generally, the image encoder model may be any neural network-based image encoder, such as the example models previously mentioned. The global embedding may be extracted from any layer of the image encoder model that generates an embedding that represents the entire input image (typically an output layer, a penultimate layer, or a relatively late layer of a CNN and/or other image encoder model). As used herein, a global embedding layer refers to a layer at which a global embedding is extracted from an image encoder. The particular layer selected as a global embedding layer may vary according to the desired implementation. In some cases, reference images are cropped prior to using these images as a reference image on which inpainting is conditioned. For example, an image of a cat in a field may first be cropped to be of desired dimensions and/or to generate a larger image of the cat prior to use as a reference image. In such contexts, the global embedding represents the cropped image (and similarly, the cropped image may be considered the reference image as this is the image that is encoded using the image encoder).

Text-based diffusion models perform inpainting by generating and inpainting content described by a text prompt in a mask region of a source image. PBE, on the other hand, is an image-conditioned inpainting method. Unlike text-conditioned inpainting, guiding inpainting using a reference image allows more precise control over the content to be inpainted.

Figure 3:
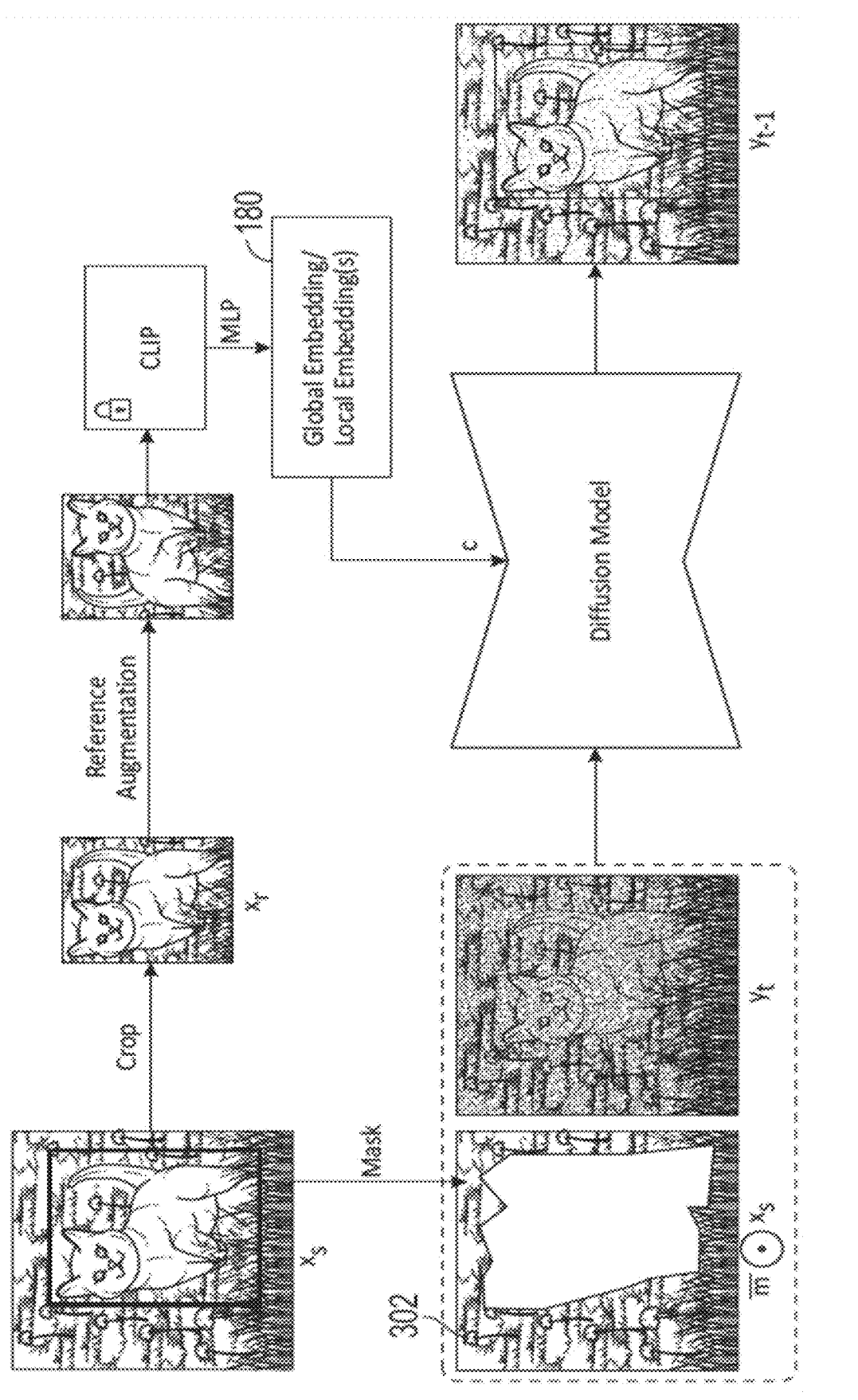
FIG. 3 depicts an example training process for a diffusion-based inpainting model, in accordance with various aspects of the present disclosure.

FIG. 3 depicts an example training process for a diffusion-based inpainting model, in accordance with various aspects of the present disclosure. A bounding box on a source image $x_s$ is used to crop out the entity to generate a reference image $x_r$. In PBE, the global embedding is extracted from the reference image $x_r$ and is used as a condition c on the denoising process performed by the diffusion model (described in further detail below). The diffusion model is tasked with taking the masked source image 302 and inpainting the entity (e.g., the cat) in the reference image $x_r$ to generate the original source image $x_s$. Loss is computed by comparing the output image (e.g., $y_{t-1}$) to the original source image $x_s$ and the loss is used to calculate gradients which are back propagated to update the parameters of the diffusion model (and the multilayer perceptron in the PBE example). PBE uses strong augmentations (e.g., image mirroring (horizontal flipping), as shown in FIG. 3) to prevent copy-and-paste artifacts. As previously described, PBE uses the global embedding (i.e., the CLS token) output by the CLIP encoder to condition the generative inpainting task.

Use of the global embedding for inpainting may be beneficial in some ways as the global embedding provides an information bottleneck that forces the model to learn semantic information in the reference image and transfer this semantic information to the source image. The global embedding results in an information bottleneck because the global embedding does not capture the precise details of the entity (e.g., the cat, in FIG. 3) in the reference image, but rather generally represents the entire image (e.g., cat in field). Without such an information bottleneck (e.g., use of a general, global embedding as well as the augmentations performed on the reference image), the model can "cheat" by copying and pasting the reference image into the source image. This leads to artifacts during inference and does not tend to create natural-looking inpainted images. For example, portions of the background in the reference image are often inpainting along with the inpainted entity, resulting in an unnatural-looking image.

Use of the global embedding (without more) to condition the inpainting task often causes the inpainting model (e.g., a generative diffusion model trained for inpainting) to fail to preserve the details of the entity in the reference image. For example, the diffusion model may struggle to maintain colors, shapes, identity, etc., of the entity in the reference image in the inpainted output image when the diffusion model is conditioned on the global embedding of the reference image. In order to improve upon such systems, various systems and techniques described herein extract both global and local embeddings from the reference image using the image encoder. For example, IMG tokens extracted from intermediate hidden layers of the CLIP encoder and/or hidden layer embeddings extracted from a CNN may be used as local embeddings. Cross attention in the diffusion model is used to attend to both the local and global embeddings, as described herein, helping the diffusion model to preserve the identity of the entity in the reference image in the inpainted output image. In various examples, a weighted combination of global attention and local attention may be used to vary the output of the diffusion model between preserving the identity of the entity in the reference image and enhancing the editability of the inpainting (e.g., making the inpainted entity look more natural in the source image, potentially at the expense of preserving the identity of the inpainted entity).

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer-based model may instead receive one or more images as input. Embeddings of the text or images may be input into a transformer encoder along with positional embeddings describing a spatial position of each the input embeddings (e.g., describing a position of a word with respect to other words or a position of a particular item embedding in an image frame). As described in further detail below, the transformer may generate output embeddings comprising predictions based on the input.

In general, the encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. For example, position information may represent the positions of the items in an input image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), in an image-processing context, two-dimensional positional embeddings may describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

Cross Attention

Additionally, the diffusion models described herein may use cross attention layers (as further described below in reference to FIG. 2. Cross attention layers may mix two different embedding sequences (e.g., the source image embedding and the local or global embeddings extracted from the reference image). One of the sequences defines the query input Q (e.g., the matrix Q described above in reference to dot product attention), while the other sequence generates the key K and value V inputs. For example, the source image embedding may define the query Q, while the local embeddings extracted from the reference image may define the key K and value V inputs. In another example, the source image embedding may define the query Q, while the global embedding extracted from the reference image may define the key K and value V inputs. As described herein, two cross attention layers (e.g., one cross attention layer to attend to local embeddings from the reference image and one cross attention layer to attend to a global embedding from the reference image) may be used at each time step of a denoising process of a diffusion-based inpainting model (e.g., diffusion model 100 of FIG. 1).

FIG. 1 depicts an example diffusion model 100 that may use local embeddings and global embeddings for inpainting, in accordance with various aspects of the present disclosure. Diffusion models have demonstrated impressive performance in image generation (including for the inpainting task) and have shown improved performance over generative adversarial networks, variational autoencoders (VAEs), and other image generation techniques. Latent diffusion models operate in a latent space for computational efficiency. Latent diffusion models are trained by progressively adding random (Gaussian) noise to encoded representations of input images over T time steps until the image approaches pure Gaussian noise. The noisy latent representations are then subjected to iterative denoising steps performed by a series of U-Nets until the initial latent representation $z_0$ is reached. A decoder of an autoencoder is used to decode the latent representation to convert back into the pixel space. During training, the resultant image may be compared to the input image and parameters of the model may be learned to minimize the difference between the resultant image and the original input image. During inference, latent diffusion models can take random noise as input (e.g., in response to an input command (e.g., a computer-executable instruction) that instructs the latent diffusion model to generate one or more images (e.g., image data), perform inpainting in a masked region of the source image, etc.). Depending on the particular latent diffusion model, this random noise input can be conditioned (e.g., using image-conditioning, as described above) to guide the image generation. The attention mechanism (described in further detail below) may be used to combine the conditioning inputs to the random latent representation input. The combined latent representation may be progressively denoised (with each time step of the denoising process generating a denoised version) until the latent representation $z_0$ is generated. This latent representation may be decoded to generate an output image (in the pixel space).

During training, an image x (e.g., the source image) may be input into an encoder 112 to generate a more compact representation of the input image (e.g., latent representation z). The encoder 112 may be an encoder of an autoencoder (e.g., a variational autoencoder) and may represent the input image x as a latent representation (e.g., a vector) z in the latent space.

Gaussian noise may be added to the latent representation z during the diffusion process (sometimes referred to as the forward process). The diffusion process may be a probability flow ODE (PF-ODE) that smoothly and incrementally converts the input data into noise over T time steps to generate the latent vector $Z_T$ which approximates pure Gaussian noise. The $Z_T$ representation may be passed through a de-noising U-Net (comprising multiple attention blocks, as shown in FIG. 1) which may be tasked with predicting the latent representation $z_{T-1}$ from the previous time step of the forward diffusion process. This process may be repeated T−1 times until arriving at the origin latent representation z, which may then be returned from the latent space to the pixel space as x̃ using the decoder 114.

The latent diffusion model depicted in FIG. 1 may be referred to as a conditional latent diffusion model. During inference, various input modalities (semantic maps, reference image(s), text, etc.) may be mapped to the latent representations during denoising. This may be achieved by transforming the conditioning input y using a dedicated encoder $\tau_\theta$ (e.g., a CLIP encoder) and then mapping the encoded conditioning input to the intermediate layers of the U-Net using the cross attention layer used by transformers. As described herein, global embeddings and one or more local embedding(s) 180 may be extracted from the encoder $\tau_\theta$ during inference to condition the inpainting. During training, the reference image may be cropped from the source image (as described in reference to FIG. 3) and the diffusion model 100 may be tasked with inpainting the cropped region in the mask region of the source image to recreate the original source image. Loss may be determined and used to update the model as previously described.

In various examples, the diffusion model 100 may be implemented by one or more computing device(s) 120. These computing devices 120 may comprise virtualized components, hardware components, software components and/or some combination thereof. Additionally, computing devices 120 may include and/or be configured in communication with non-transitory computer-readable memories 103 (e.g., over a computer communication network such as network 104). The non-transitory computer-readable memories 103 may store computer-executable instructions that, when executed by one or more processors may be effective to perform the frequency-aware distillation of diffusion models described herein.

Latent Diffusion Models

Diffusion models are generative models that learn the data distribution by reversing a fixed-length Markovian forward process, thereby iteratively denoising a normally distributed variable. In some cases, instead of using the pixel space, denoising can be conducted in a latent space, which is computationally efficient as it reduces the dimension of images. Additionally, use of the latent space omits the high frequency noise within the given image. One example of a latent diffusion models is Stable Diffusion, which includes three main components: A Variational Autoencoder (VAE) to transform the given input in a latent space, a text encoder to process the given text on which image generation is conditioned, and a time-conditioned U-Net to predict the noise that is added on the image latents which is conditioned by the text embeddings. Mathematically, the conditioned latent diffusion model can be learned by optimizing the following loss:

$$L_{LDM} = \mathbb{E}_{\mathcal{E}(x),c,\epsilon,t}\left[\|\epsilon_\theta(z_t, t, c) - \epsilon\|_2^2\right] \tag{1}$$

where, $z_t$ is the latent version of the input $x_t$ provided by the VAE as $z = \mathcal{E}(x)$. $x_t$ is the noise added version of the input x, at a timestep of t, where $x = \alpha_t x_0 + (1-\alpha_t)\epsilon$ and $\alpha_t$ decreases with the timestamp t. Noise is denoted by $\epsilon - \mathcal{N}(0,1)$. $\epsilon_\theta$ is the UNet. Lastly, c denotes the conditioning variable.

Image Inpainting

For the inpainting task, the objective may be defined as follows: Given a source image x, a binary map of mask region m (where mask region pixels are 1), and a reference image (or images), r, the objective is to generate an output image, where the mask region given by m is as similar as possible to r, and regions defined by −m remains as unchanged as possible, where denotes an all-ones matrix. However, the objective is not to just copy-paste the given reference image in the mapped region, but to do so in as plausible and realistic a way as possible. For the inpainting, the objective can be defined mathematically by:

$$L_{LDM} = \mathbb{E}_{\mathcal{E}(x),c,\epsilon,t}[\|\|\epsilon_\theta(z_t, \mathcal{E}(-m) \odot x), m, t, c) - \epsilon\|_2^2] \qquad (2)$$

Here, the U-Net takes two additional inputs in addition to input latents: VAE-processed masked image (e.g., "masked latents"), and the mask itself. Stable Diffusion has an inpainting mode which was trained on a LAION-aesthetics v2.5 dataset using classifier-free guidance, where during training, synthetic masks are generated to mask 25% of the pixels, which in turn conditions the model for inpainting.

Paint by Example (PBE)

As previously described, text-conditioned inpainting is generally not enough to embed fine-grained details of an entity or object to be inpainted. Fortunately, as described herein, the conditioning of the latent diffusion models is not limited to textual prompts but can also be guided by images. However, as described above, it is not straightforward to condition the diffusion models on images as the model generally tends to copy the object given in r as is, instead of blending it with the x. More precisely, if c in Eq. 2 is selected as image, whose embeddings are given by the CLIP image encoder, the model just learns the trivial mapping function, where, $(-m) \odot x + r = x$. PBE introduced a number of design choices to tackle the trivial mapping problem. Instead of utilizing all image tokens that CLIP image encoder outputs, PBE leverages only the CLS token, which helps preserving semantics while preventing the trivial solution. However, the general nature of the CLS token results in omission of fine-grained virtual item details. Furthermore, PBE adds fully connected layers (e.g., the MLP in FIG. 3) to decode the CLS token, and inject the decoded CLS token into the U-Net. In various approaches described herein, an additional cross attention layer may be added to the U-Net for attending on local features of the reference image, while the conventional U-Net cross attention layers may be used to attend on global features of the reference image.

Figure 2:
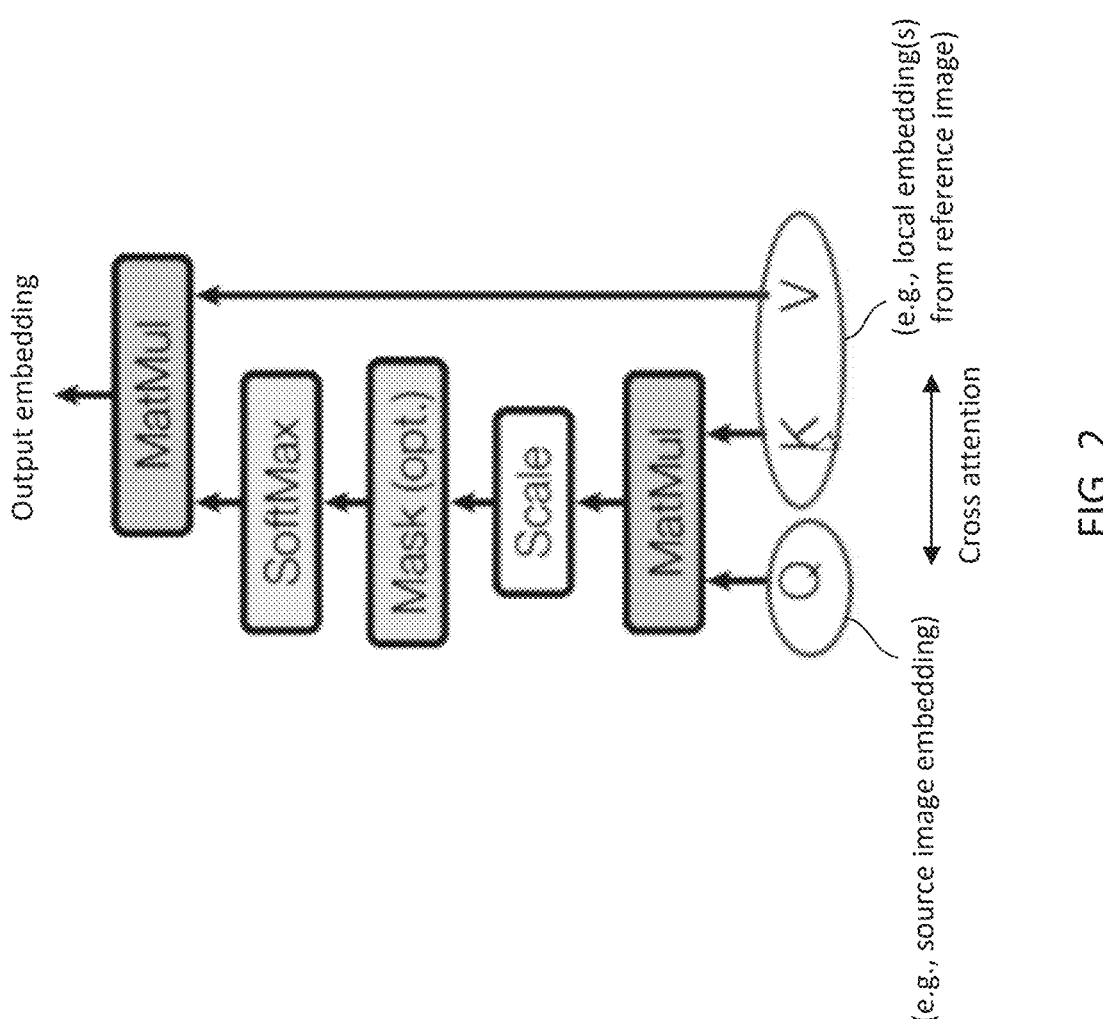
FIG. 2 depicts an example cross attention layer for attending between the source image embedding and local embeddings of the reference image, in accordance with various aspects of the present disclosure.

FIG. 2 depicts an example cross attention layer for attending between the source image embedding and local embeddings of the reference image, in accordance with various aspects of the present disclosure. In various examples, the diffusion model 100 may include cross attention layers in the transformers of the U-Net that attend between the embeddings of the source image and the global embedding extracted from the reference image using the image encoder. Additionally, the diffusion model 100 may be modified relative to traditional diffusion models (including PBE) to add additional cross attention layers that attend on the local embeddings extracted from the reference image.

As shown, one input embedding sequence to the cross attention layer may be used as the query Q while the other input embedding sequence to the cross attention layer may be used as the key K and value V. For example, the embedding of the source image may be used as Q and the local embedding extracted from the reference image may be used as K and V or the local embedding may be used as Q and the source image embedding may be used as K and V. Matrix multiplication layers may be used followed by a softmax layer. The output may be multiplied by V by a second matrix multiplication layer to generate the output embedding for the cross attention layer.

Using Local Features Zero-Shot in PBE

PBE is trained to use global embedding to represent the reference image. In a first experiment, U-Net may be enabled to cross-attend on IMG tokens (local embeddings of the reference image extracted from intermediate layers of the image encoder) directly at inference time without explicitly fine-tuning on such local embeddings (zero-shot usage of local embeddings). For example, the IMG tokens from different hidden layers (e.g., hidden layer indices 25, 4, 8, 12, 16) of CLIP may be used to generate a tensor of shape [B, 5, seq_len, dimension]. In this example, seq_len is equal to the number of IMG tokens, which is 256.

In the example, the embeddings may be averaged along the first dimension (e.g., averaging all IMG tokens corresponding to the same patch from different hidden layers) and may be concatenated with the global CLIP embedding (e.g., the CLS token from the last layer of CLIP) and may be passed to U-Net for cross attention (using the conventional PBE model cross attention architecture).

However, the results from such an experiment show that this approach does not produce high quality images. The hypothesis is that the PBE model treats each local embedding as a global embedding and attempts to create an entire entity depicting that local embedding.

Training PBE Using Concatenated Local and Global Features

In a second experiment, both local embeddings (e.g., IMG tokens extracted from the reference image by CLIP) and global embeddings (e.g., the CLS token extracted from the last layer of CLIP) may be extracted and passed through a trainable layer (e.g., an MLP as shown in FIG. 3) that is finetuned during training. The embeddings may be concatenated together and U-Net may cross attend on this sequence.

In this example, the cross attention layers of a pretrained PBE (that is originally trained only using global embeddings of reference images) may be finetuned using the combined IMG+CLS token sequence generated as described above. This approach performs better for the inpainting task (relative to use of a pretrained PBE trained only on global embeddings). Additionally, no additional parameters are added to the pre-trained model for this example implementation as only the existing U-Net cross attention layers are fine-tuned.

Training PBE Using Local Features and Global Features with Separate Cross Attention on Local and Global Features As described above, in some examples, additional cross attention layers may be added to the diffusion model 100 at each time step. These additional cross attention layers may be finetuned on local embeddings (e.g., IMG tokens extracted from intermediate hidden layers of CLIP). Existing cross attention layers that attend on the global embeddings may be frozen (e.g., maintained) during fine-tuning. The attention data (e.g., attention scores) from these two cross attention layers may be combined using:

$$\text{overall\_attention} = \text{global\_attention} + \lambda \text{local\_attention} \qquad (3)$$

where λ is a tunable weighting parameter. This example adds additional parameters to the model for the added cross attention layers that cross-attend on local embeddings of the reference image. Additionally, a separate multi-layer perceptron may be added on the image encoder (e.g., CLIP) to extract the local embeddings.

Figure 4:
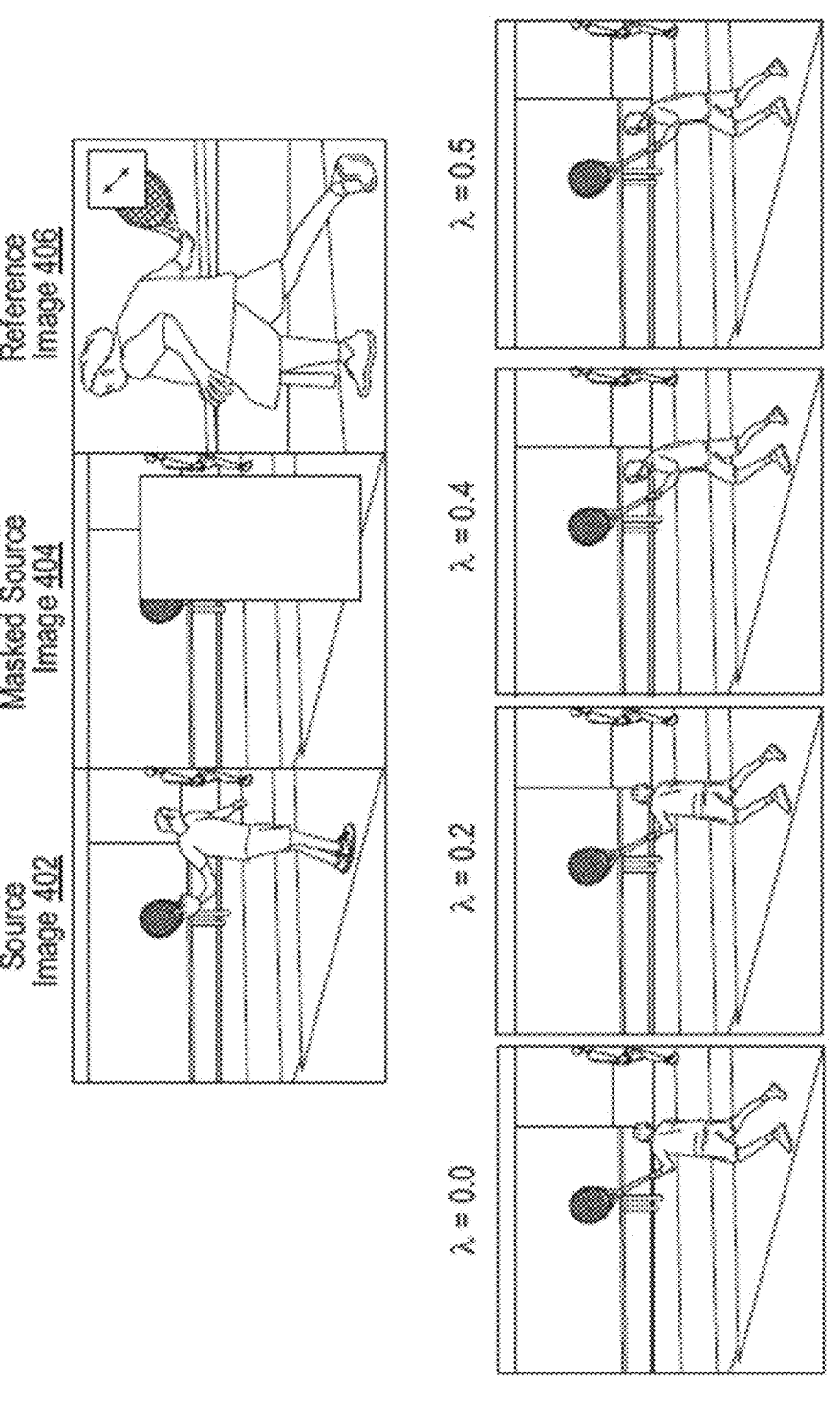
FIG. 4 depicts examples of inpainting using various weighted combinations of global and local attention data, in accordance with various aspects of the present disclosure.

FIG. 4 depicts examples of inpainting using various weighted combinations of global and local attention data, weighted using equation (3), above. In FIG. 4, the tennis player in source image 402 is masked out to generate masked source image 404. The mask may be generated using a natural language input (e.g., using a multimodal encoder such as CLIP). Reference image 406 represents a different entity (a different tennis player) to be inpainted into the masked region of the masked source image 404.

As can be seen, the identity details of the entity in reference image 406 improve as λ values increase (e.g., see color of clothes, hair styles, etc.), but it also brings in more details from the reference images. However, in some examples, an additional foreground mask may be provided for reference images to avoid inpainting irrelevant details from the reference image into the source image. λ may be tuned to balance between editability of the inpainted entity and preservation of the identity of the entity in the reference image. In general, higher values of λ may preserve identity of the entity in the reference image (potentially at the expense of introducing background details of the reference image into the masked region), while lower values of λ, may lose identity of the entity but may result in more natural-looking inpainted regions in the inpainted output image.

Figure 5:
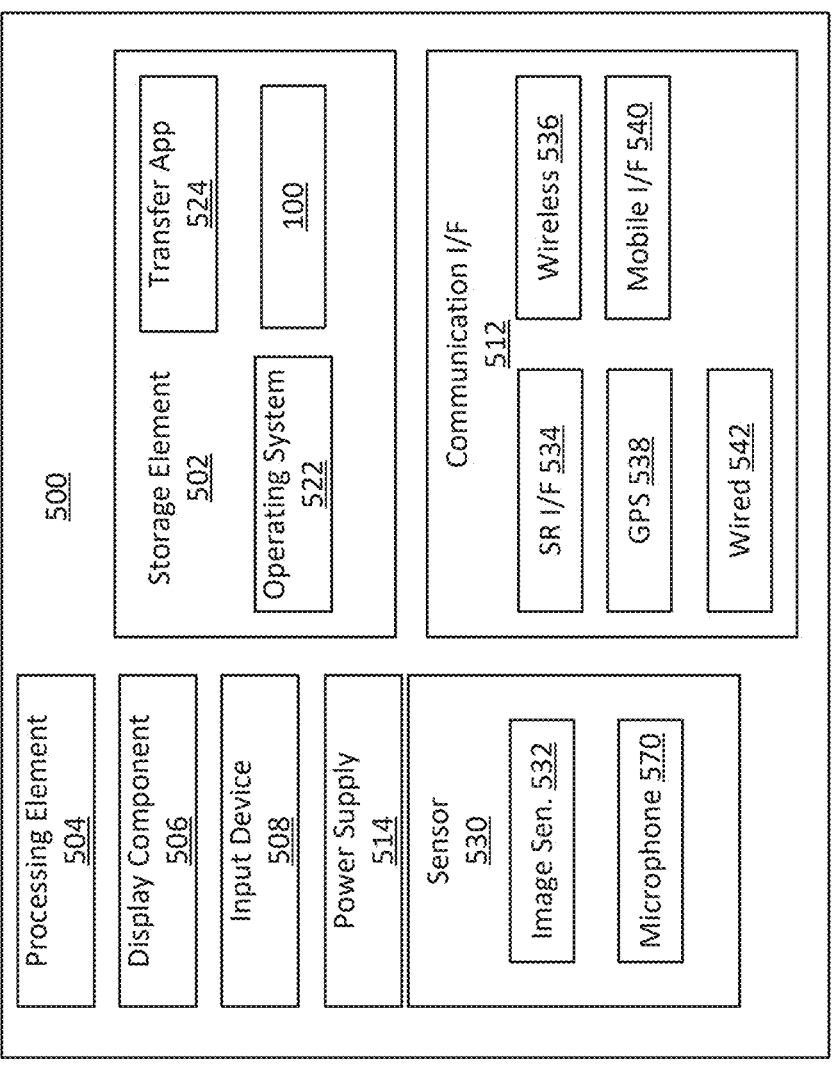
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the diffusion models, generative models, transformers, encoders, and/or the other models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store diffusion model 100 (including parameters thereof), and/or other machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, track-ball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
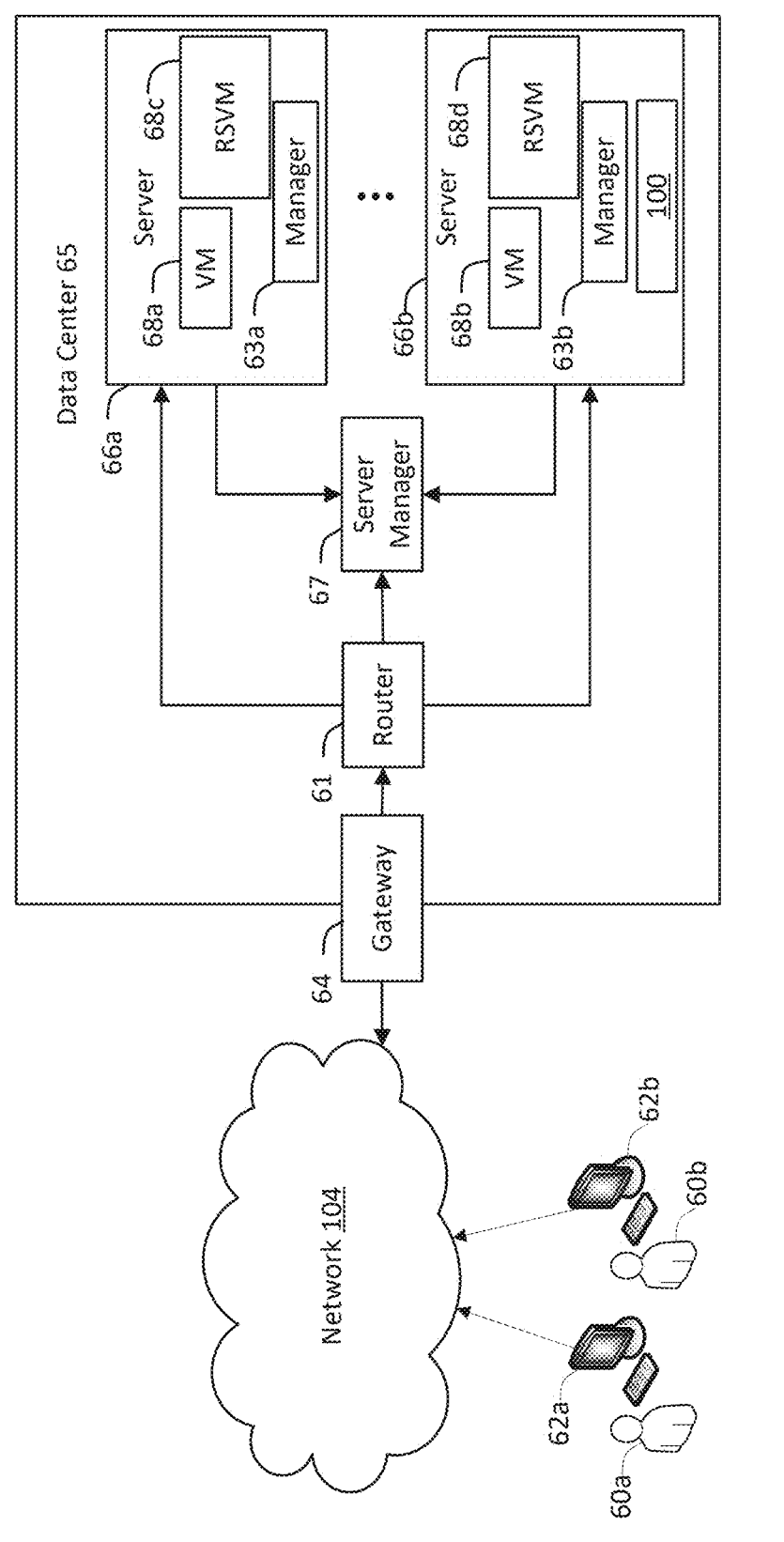
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines. As shown, the diffusion model 100 including additional cross attention layers for attending on local features may be implemented by one or more of servers 66 (e.g., as a service).

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

FIG. 7 is a block diagram illustrating an example process 700 for image-conditioned image editing using local features, in accordance with embodiments of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a source image may be received by a diffusion model. For example, diffusion model 100 may receive source image data depicting an image in which generated image data is to be inpainted. For example, input source image 802 (e.g., an RGB image) in FIG. 8A may be an example of a source image.

Processing may continue at action 720, at which a first mask region of first mask data (e.g., input mask data 803) may be received that identifies first pixels in the source image. Original mask region 804 from FIG. 8A may be an example of the first mask region. The first mask region may identify first pixels in the source image. For example, the original mask region 804 may identify (using pixel coordinates of the source image (e.g., (x, y) pixel coordinates)) pixels from the source image that are to be masked out (e.g., for inpainting). For example, the mask data 803 may be of the same resolution as the input source image 802. Pixels of the original mask region 804 may be labeled with "mask out" data (data indicating that these pixels should be masked out) and may have pixel addresses that correspond to the pixels in the input source image 802 that are to be masked out (e.g., replaced and/or inpainted). The first mask region (e.g., original mask region 804) may be generated in a variety of ways. For example, the first mask region may be manually drawn by a user of diffusion model 100. It should be noted that although the original mask region 804 of FIG. 8A is rectangular, the mask region may be any shape. For example, a user may draw and/or trace a mask region using an electronic pen and/or their finger (on a touchscreen device) to identify a mask region. In still other examples, a multimodal segmentation model may take a natural language input that identifies some object in the source image and may determine the pixels in the source image corresponding to the identified object. In the example of FIG. 8A, a user may use such a multimodal segmentation model by inputting text or speech such as "replace the boots and the small rug on the floor with a brown poodle." The multimodal segmentation model may identify the pixels of input source image 802 that correspond to the boots and the small rug on the floor and may generate a mask region (e.g., original mask region 804) to cover these pixels.

In various examples, diffusion model 100 and/or other computer-implemented logic may be used to determine a ratio of the size of the first mask region to the size of the input frame. This ratio may be compared to a threshold size ratio to determine if the size of the mask region relative to the size of the input image frame is below a threshold value. The "size" in this context may be determined using an area of pertinent image data. For example, the size of the mask region may be defined by an area of the mask region, by a number of pixels included in the mask region, (e.g., masked pixels), etc. Similarly, the size of the input image may be the resolution (e.g., height×width, in terms of pixels or other desired units). The threshold ratio may be empirically determined based on inpainting model performance. If the ratio of mask region size to source image size (input frame size) is above the threshold, the following steps of FIG. 7 may be skipped (e.g., the upsampling and downsampling steps) and the input source image 802 and original mask region 804 of mask data 803 may be input into the diffusion model 100 together with any desired prompt(s) for inpainting.

Conversely, if the ratio of mask region size to source image size (input frame size) is less than the threshold (e.g., a threshold ratio), processing may continue at action 730, at which first cropped image data that includes the first pixels and second pixels at least partially surrounding the first pixels in the first source image may be generated. For example, logic may be used to take pixels surrounding the original mask region 804 from the input source image 802, as shown in the example cropped image data 806 of FIG. 8B. The cropped image data 806 may be a cropped RGB image cropped from the input source image 802. As shown, the cropped image data 806 includes some pixels that surround the original mask region 804 from the input source image 802. These surrounding "second pixels" help to provide context of the background during inpainting.

Figure 8B:
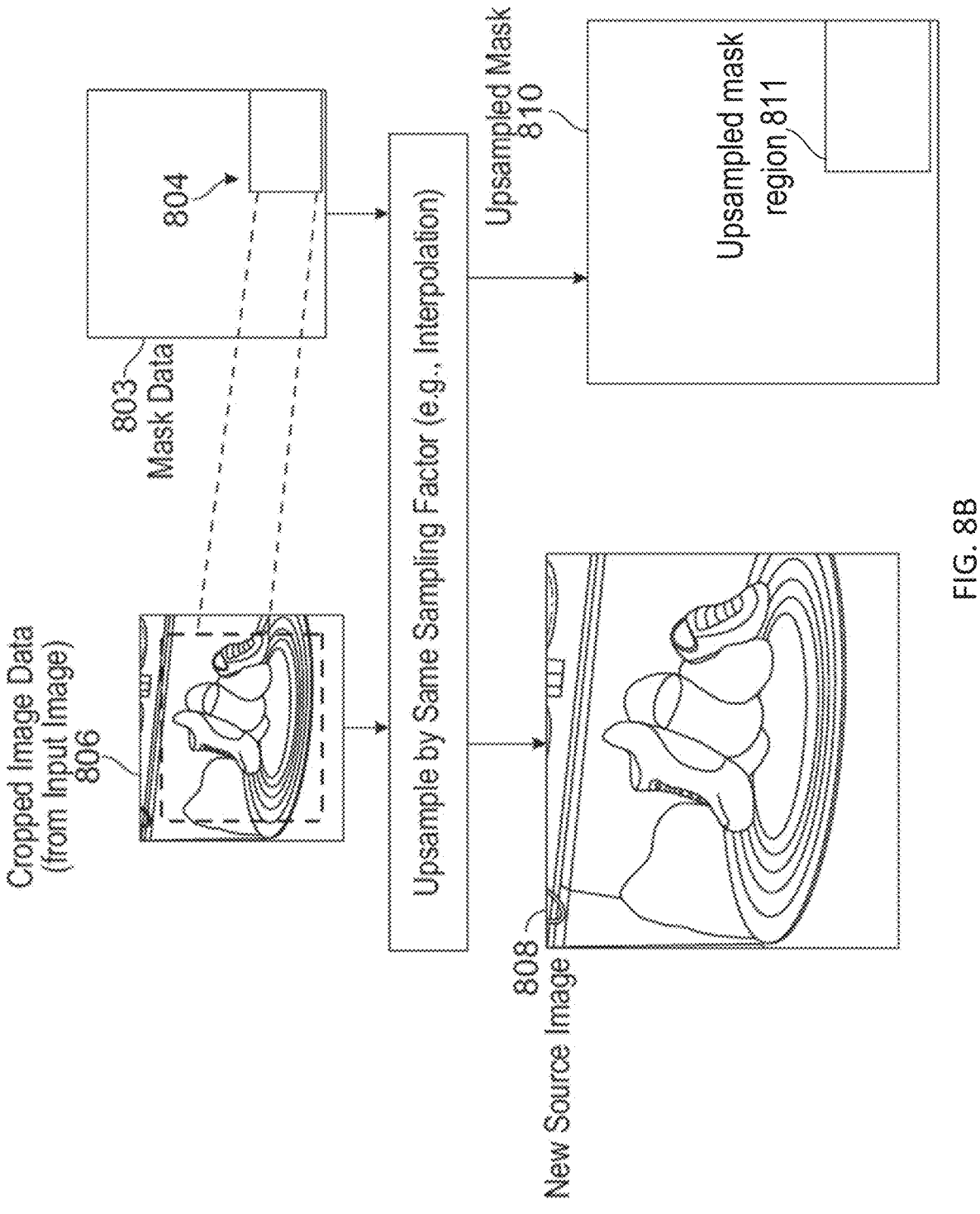

Processing may continue at action 740, at which a second source image may be generated by upsampling the first cropped image data. For example, as shown in FIG. 8B, new source image 808 (an example of the second source image) may be generated by upsampling the cropped image data 806. Generally, upsampling may use interpolation to increase the resolution (e.g., number of pixels) in an input image. The factor of upsampling indicates the scale by which the input image is upsampled. For example, upscaling using a factor of two will result in an upsampled image having twice the pixels of the original input image. Any desired upsampling technique may be used to upsample the first cropped image data. For example, nearest neighbor interpolation, bilinear interpolation, bicubic interpolation, Lanczos filtering (and/or other convolutional interpolations), etc. In various examples, different upsampling techniques may be used for the mask data 803 (including the original mask region 804) and the cropped image data 806. For example, nearest neighbor interpolation may be used to upsample original mask data 803 to generate upsampled mask 810 (including an upsampled mask region 811) in order to generate binary upsampled values (e.g., "mask" or "do not mask" values). By contrast, bilinear interpolation may be used to upsample cropped image data 806 in order to generate continuous values (e.g., floating point pixel values). However, the same sampling factor may be used for upsampling the mask data 803 and the cropped image data 806 (even if different interpolation techniques are used). As shown in FIG. 8B, after upsampling a new source image 808 may be generated. The upsampled image may be referred to as a "source image" since this is the image which will be input into the diffusion model 100 for inpainting.

Processing may continue at action 750, at which upsampled mask data may be generated by upsampling image data of the first mask region by the same factor as the upsampling of the first cropped image. As shown in FIG. 8B, the original mask region 804 may be upsampled using the same sampling factor that was used to upsampled the cropped image data 806 to generate the upsampled mask 810 including the upsampled mask region 811. As shown in FIG. 8B, the upsampled mask region 811 is smaller than the new source image 808 such that when the upsampled mask region 811 is applied to the new source image 808, some pixels of new source image 808 that at least partially surround the upsampled mask region 811 are exposed (i.e., unmasked) in order to provide background context for diffusion model 100.

Figure 8C:
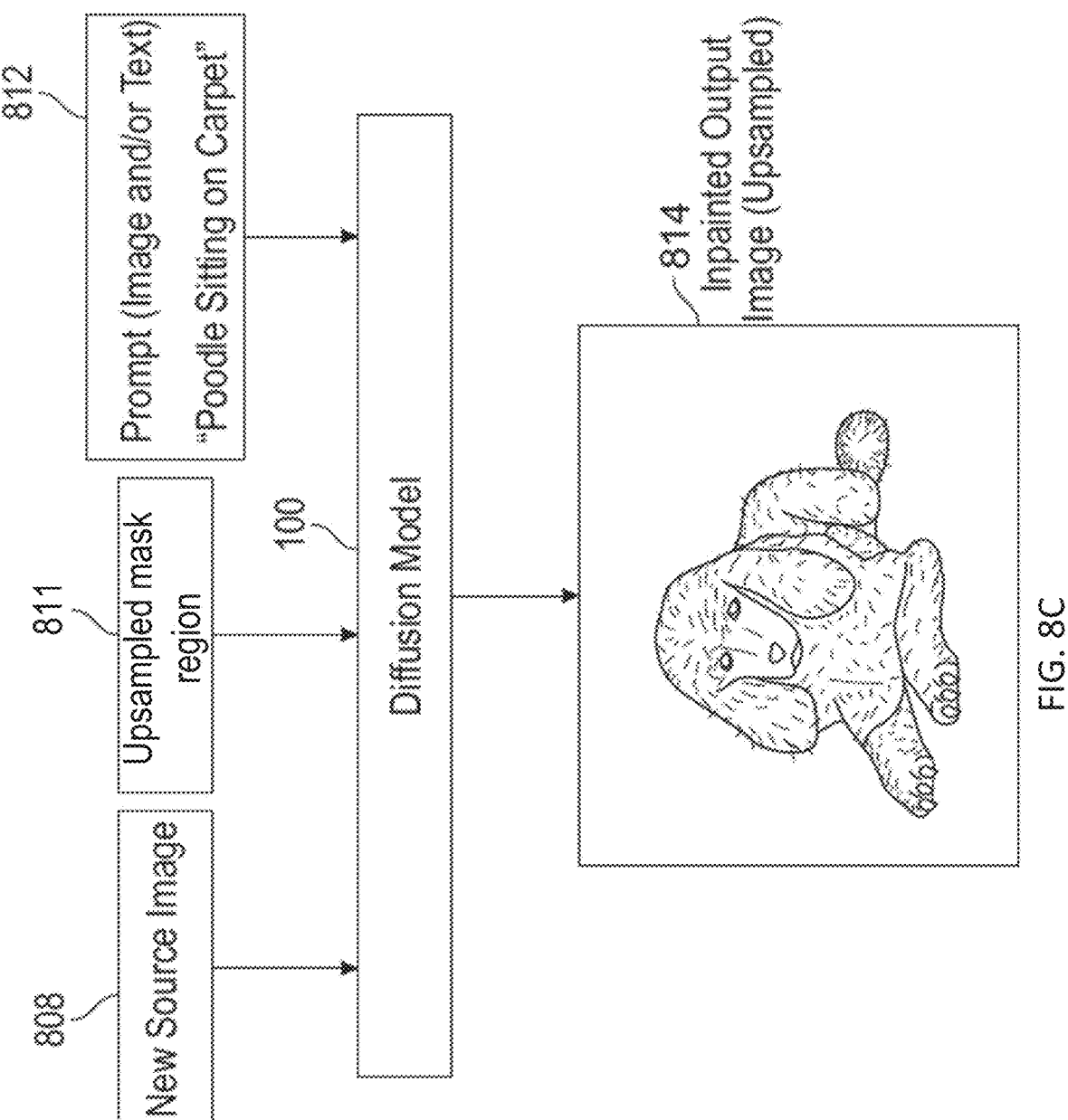

Processing may continue at action 760, at which an inpainting prompt may be received. The inpainting prompt may be a text prompt (e.g., provided by a user and/or another system), an image prompt (e.g., a reference image as described herein), and/or some combination of a text prompt and an image prompt. In the examples shown in FIG. 8C, the prompt 812 may include the text "Poodle sitting on carpet." In some examples, the prompt 812 may include an image of the desired poodle to be inpainted instead of, or in addition to, the text prompt.

Processing may continue at action 770, at which a diffusion-based inpainting model (e.g., diffusion model 100) may generate a first output image comprising the second source image inpainted in a region corresponding to the upsampled mask data, where the second source image is inpainted based on the inpainting prompt. In the example shown in FIG. 8C, the new source image 808 (an example of the second source image) is input into diffusion model 100 along with the upsampled mask region 811, and the prompt 812. The diffusion model 100 generates the inpainted output image 814 of a poodle sitting on the carpet, as instructed in the prompt 812. The inpainted output image 814 may be of the same resolution as the new source image 808. In other words, the inpainted output image may be upsampled relative to the original input source image 802. Additionally, by providing some surrounding pixels (relative to the upsampled mask region 811) in the new source image 808, the diffusion model 100 is provided with context to enable the diffusion model 100 to inpaint the poodle in a way that appears natural with respect to the background of the input source image 802.

Figure 8D:
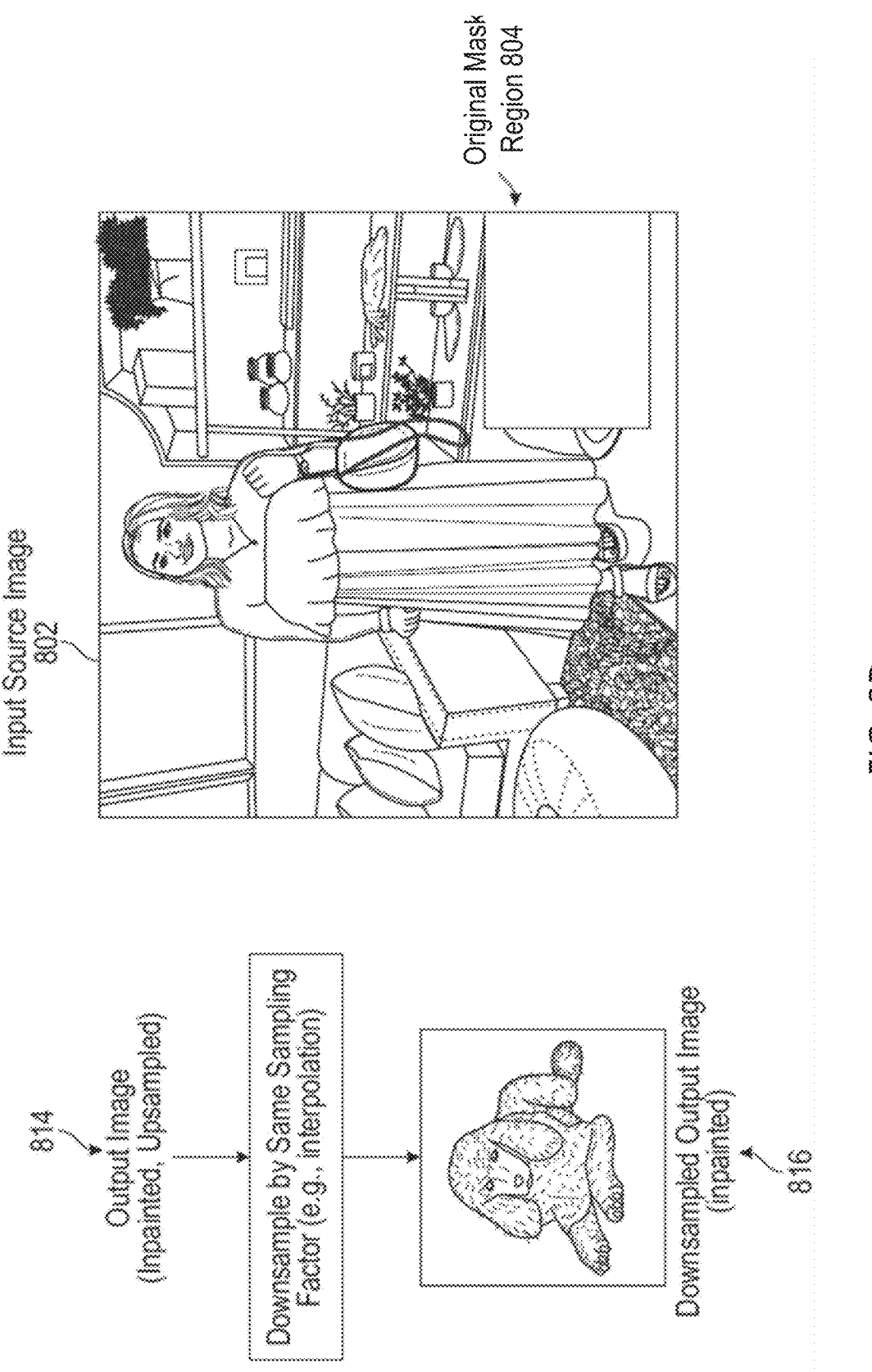

Processing may continue at action 780, at which downsampled output image data may be generated by downsampling the first output image by the same factor. For example, as shown in FIG. 8D, the output image 814 which has been inpainted and which is at the upsampled resolution, may be downsampled by the same sampling factor such that downsampled output image 816 is of a resolution that corresponds to the cropped image data 806 which was cropped from the original input source image 802.

Figure 8E:
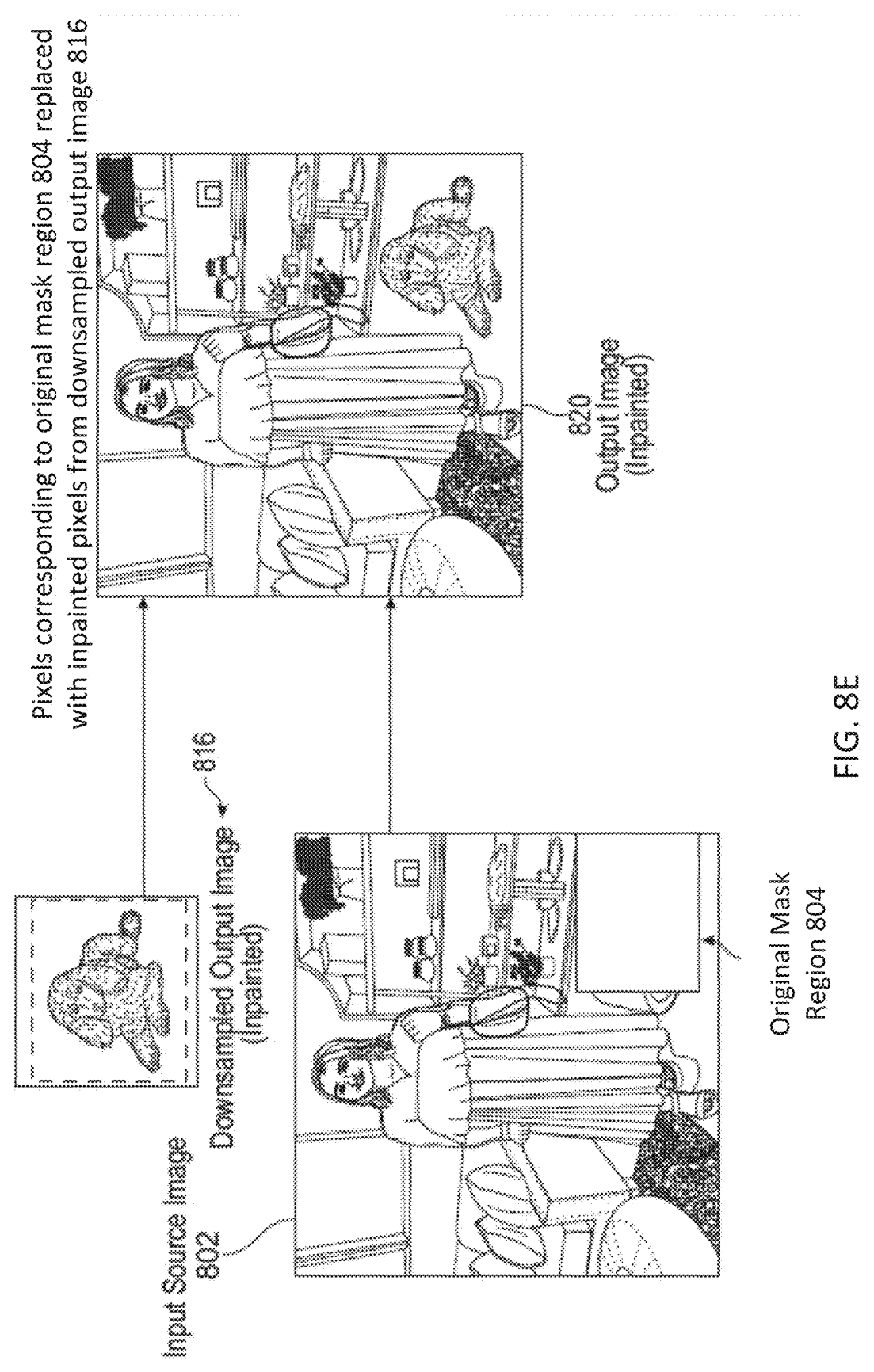

Processing may continue at action 790, at which a second output image may be generated by replacing the first pixels corresponding to the first mask region in the first source image with corresponding inpainted pixels in the downsampled output data. For example, as illustrated in FIG. 8E, the first pixels of the input source image 802 that correspond to the original mask region 804 (e.g., the first pixels being identified by the pixel coordinates of the original mask region 804) may be replaced by the corresponding pixels in the downsampled output image 816 to generate output image 820. It should be noted that since downsampled output image 816 has additional background pixels (and is therefore larger in height and/or width relative to the original mask region 804) that this operation is not a simple copy-and-paste of the downsampled output image 816 at the location of the original mask region 804 in the input source image 802. Instead, only the pixels of downsampled output image 816 that have the same pixel coordinates as pixels of the original mask region 804 are replaced in order to generate the inpainted output image 820. Replacing pixels, in this context, refers to replacing a pixel value of the input source image with the value of a corresponding pixel (e.g., a pixel having the same coordinates) in the downsampled output image 816.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
   receiving a first source image;
   receiving first mask data comprising a first mask region that identifies first pixels in the first source image;
   generating first cropped image data comprising the first pixels and second pixels at least partially surrounding the first pixels in the first source image;
   generating a second source image by upsampling the first cropped image data;
   generating an upsampled mask region by upsampling the first mask region by a same factor as the upsampling the first cropped image data;
   receiving an inpainting prompt;
   generating, by a diffusion-based inpainting model, a first output image comprising the second source image inpainted in a region corresponding to the upsampled mask data, wherein the second source image is inpainted based on the inpainting prompt;
   generating downsampled output data by downsampling the first output image by the same factor; and
   generating a second output image by replacing the first pixels corresponding to the first mask region in the first source image with corresponding inpainted pixels in the downsampled output data.

2. The computer-implemented method of claim 1, further comprising:
   determining a first area of the first mask region;
   determining a second area of the first source image;
   determining a ratio of the first area to the second area; and
   determining that the ratio is below a threshold ratio, wherein the generating the first cropped image data and the generating the second source image data by upsampling are performed based on the ratio being below the threshold ratio.

3. The computer-implemented method of claim 1, wherein the first mask data comprises a binary mask that masks out pixels in the first mask data that have a first binary value and maintains pixels of the first mask data that have a second binary value.

4. The computer-implemented method of claim 1, wherein the first cropped image data comprises an RGB image.

5. A method comprising:
   receiving a first source image;
   receiving first mask region identifying first pixels of the first source image;

determining a second source image comprising the first pixels of the first source image and second pixels of the first source image that at least partially surround the first pixels;

generating upsampled image data by upsampling the second source image;

generating upsampled mask data by upsampling image data of the first mask region;

generating, by a diffusion-based inpainting model, a first inpainted image comprising the upsampled image data inpainted in a region corresponding to the upsampled mask data; and generating a first downsampled image by downsampling the first inpainted image.

6. The method of claim 5, further comprising generating the first downsampled image by downsampling the first inpainted image to a resolution of the first source image.

7. The method of claim 6, further comprising:

determining second pixels of the first downsampled image corresponding to the first pixels of the first mask region; and generating an output image by replacing the first pixels of the first source image with the second pixels of the first downsampled image.

8. The method of claim 5, wherein first mask data comprises a binary mask that is configured to mask out pixels in the first mask data that have a first binary value and maintain pixels of the first mask data that have a second binary value, wherein pixels of the first mask region have the first binary value.

9. The method of claim 5, wherein the second source image comprises an RGB image that is cropped from the first source image.

10. The method of claim 5, further comprising:

determining a first number of the first pixels in the first mask region;

determining a second number of pixels in the first source image;

determining a ratio of the first number to the second number; and determining that the ratio is below a threshold ratio, wherein the determining the second source image and the generating the upsampled image data are performed based on the ratio being below the threshold ratio.

11. The method of claim 5, further comprising:

receiving a first reference image, wherein the generating the first inpainted image comprises inpainting a representation of an entity in the first reference image in the region of the upsampled image data corresponding to the upsampled mask data.

12. The method of claim 5, further comprising determining that a first size of the first mask region is below a threshold size relative to a second size of the first source image, wherein the upsampled image data and the upsampled mask data is generated based at least in part on the first size of the first mask region being below the threshold size relative to the second size of the first source image.

13. A system comprising:

at least one processor; and non-transitory computer-readable memory storing instructions that, when executed by the at least one processor, are effective to:

receive a first source image;

receive first mask region identifying first pixels of the first source image;

determine a second source image comprising the first pixels of the first source image and second pixels of the first source image that at least partially surround the first pixels;

generate upsampled image data by upsampling the second source image;

generate upsampled mask data by upsampling image data of the first mask region;

generate, by a diffusion-based inpainting model, a first inpainted image comprising the upsampled image data inpainted in a region corresponding to the upsampled mask data; and generate a first downsampled image by downsampling the first inpainted image.

14. The system of claim 13, the non-transitory computer-readable memory storing further instructions that, when executed by the at least one processor, are further effective to:

generate the first downsampled image by downsampling the first inpainted image to a resolution of the first source image.

15. The system of claim 14, the non-transitory computer-readable memory storing further instructions that, when executed by the at least one processor, are further effective to:

determine second pixels of the first downsampled image corresponding to the first pixels of the first mask region; and generate an output image by replacing the first pixels of the first source image with the second pixels of the first downsampled image.

16. The system of claim 13, wherein first mask data comprises a binary mask that is configured to mask out pixels in the first mask data that have a first binary value and maintain pixels of the first mask data that have a second binary value, wherein pixels of the first mask region have the first binary value.

17. The system of claim 13, wherein the second source image comprises an RGB image that is cropped from the first source image.

18. The system of claim 13, the non-transitory computer-readable memory storing further instructions that, when executed by the at least one processor, are further effective to:

determine a first number of the first pixels in the first mask region;

determine a second number of pixels in the first source image;

determine a ratio of the first number to the second number; and determine that the ratio is below a threshold ratio, wherein the determining the second source image and the generating the upsampled image data is performed based on the ratio being below the threshold ratio.

19. The system of claim 13, the non-transitory computer-readable memory storing further instructions that, when executed by the at least one processor, are further effective to:

receive a first reference image, wherein the generating the first inpainted image comprises inpainting a representation of an entity in the first reference image in the region of the upsampled image data corresponding to the upsampled mask data.

20. The system of claim 19, the non-transitory computer-readable memory storing further instructions that, when executed by the at least one processor, are further effective to:

determine that a first size of the first mask region is below a threshold size relative to a second size of the first source image, wherein the upsampled image data and the upsampled mask data is generated based at least in part on the first size of the first mask region being below the threshold size relative to the second size of the first source image.

* * * * *